United States Patent
Lipponen et al.

(10) Patent No.: US 7,412,258 B1
(45) Date of Patent: Aug. 12, 2008

(54) ELECTRONIC DEVICE AND A METHOD IN AN ELECTRONIC DEVICE

(75) Inventors: Markku Lipponen, Tampere (FI); Ari Aho, Tampere (FI)

(73) Assignee: Nokia Corporation, Espoo, FL (US)

(*) Notice: Subject to any disclaimer, the term of this patent is extended or adjusted under 35 U.S.C. 154(b) by 362 days.

(21) Appl. No.: 09/716,880

(22) Filed: Nov. 20, 2000

(30) Foreign Application Priority Data

Nov. 24, 1999 (FI) .................................. 19992510

(51) Int. Cl.
*H04M 1/00* (2006.01)
(52) U.S. Cl. .................. 455/556.1; 455/90.3; 455/557; 455/550
(58) Field of Classification Search ............... 455/556.1, 455/566, 575.3, 575.8, 90, 557, 550, 90.3, 455/95; 345/168, 169, 173, 175; 700/18, 700/19, 20; 341/22
See application file for complete search history.

(56) References Cited

U.S. PATENT DOCUMENTS

| | | | | |
|---|---|---|---|---|
| 3,988,551 | A | 10/1976 | Larson | 200/5 A |
| 3,995,126 | A | 11/1976 | Larson | 200/5 A |
| 4,615,252 | A * | 10/1986 | Yamauchi et al. | 84/687 |
| 4,916,996 | A * | 4/1990 | Suzuki et al. | 84/603 |
| 5,584,054 | A | 12/1996 | Tyneski et al. | 455/89 |
| 5,646,649 | A | 7/1997 | Iwata et al. | 345/173 |
| 5,742,894 | A | 4/1998 | Jambhekar et al. | 455/90 |
| 6,067,074 | A * | 5/2000 | Lueders | 345/156 |
| 6,128,475 | A * | 10/2000 | Wicks et al. | 455/575.4 |
| 6,131,047 | A * | 10/2000 | Hayes et al. | 455/566 |
| 6,164,531 | A * | 12/2000 | Harris et al. | 235/380 |
| 6,243,595 | B1 * | 6/2001 | Lee et al. | 455/566 |
| 6,411,285 | B1 * | 6/2002 | Miyazawa | 345/173 |
| 6,424,844 | B1 * | 7/2002 | Lundqvist | 455/566 |
| 6,587,675 | B1 * | 7/2003 | Riddiford | 455/557 |
| 6,793,619 | B1 * | 9/2004 | Blumental | 600/38 |
| 6,847,310 | B1 * | 1/2005 | Gill et al. | 341/22 |
| 2001/0012769 | A1 * | 8/2001 | Sirola et al. | 455/90 |
| 2003/0025679 | A1 * | 2/2003 | Taylor et al. | 345/175 |
| 2006/0009861 | A1 * | 1/2006 | Bonasia et al. | 700/18 |

FOREIGN PATENT DOCUMENTS

| | | | |
|---|---|---|---|
| GB | 2289595 | | 11/1995 |
| GB | 2297662 | | 8/1996 |
| WO | WO 97/41677 | * | 11/1997 |
| WO | WO 98/16047 | * | 4/1998 |
| WO | WO 98/19434 | * | 5/1998 |

* cited by examiner

*Primary Examiner*—Tan Trinh
(74) *Attorney, Agent, or Firm*—Perman & Green, LLP

(57) ABSTRACT

An electronic device (1) comprises preferably at least a keyboard (4), which comprises at least one key (15a, 15b) for controlling the functions of an electronic device (1). This keyboard (4) is arranged as a keyboard plate (16). Said keyboard (4) is implemented so that it also comprises a touch sensitive element (19), over which said keyboard plate (16) is arranged so that the depression of a key is arranged to be transmitted to a touch sensitive element (19) essentially at the point of a key (15a, 15b). In addition, the electronic device (1) comprises means (21, 22b) for determining the point of depression from the touch sensitive element (19), whereby on the basis of the determined point of depression it is determined which key (15a, 15b) has been depressed.

15 Claims, 6 Drawing Sheets

ELECTRONIC DEVICE AND A METHOD IN AN ELECTRONIC DEVICE

This invention relates to an electronic device according to the preamble of claim 1. This invention also relates to a method in an electronic device according to the preamble of claim 9. This invention also relates to a keyboard of an electronic device according to the preamble of claim 15.

In order to improve mobile communications available for people, various mobile communication equipment, such as cordless phones and mobile stations, have been provided in the prior art. A very popular piece of mobile communication equipment is the mobile station, which can be, for instance, a digital mobile station operating in a mobile communication system based on a cellular network according to the GSM standard (Global System for Mobile Communications).

Various devices for saving information, such as notebook computers, small hand-held computers or PDA (Personal Digital Assistant) devices are also known in the prior art. These devices can be used to save information given by the user, such as calendar data, notes, addresses and telephone numbers. Input of information in these devices usually takes place by means of a keyboard, but it is also possible to save textual information in some devices by writing it directly to a touch sensitive display by means of a stylus, for example. The performance of these devices is continuously increasing, and they already include many properties known from PC devices (Personal Computers). Extension cards according to the PCMCIA (Personal Computer Memory Card International Association) standard are available for some devices for coupling these devices to mobile stations, for example. Then it is possible to use PDA devices, for example, by means of radio waves, to send and receive telefax messages, short messages (SMS, Short Message Service) and other text files wirelessly. In this explanation, a PDA device means a device according to the above description.

There are also known devices in which the operations of a mobile communication device and a PDA device have been combined. One such known device is the Nokia Communicator 9110, by which it is possible to connect to the Internet, use radiotelephone functions, such as receiving a call and selecting a number, and receive telefax messages, for example. The properties of mobile communication devices, such as mobile stations, are continuously increasing and usually include operations for saving the telephone numbers of persons and companies, for example. In this specification, the term mobile station means a mobile station which includes operations of the above described PDA device or a corresponding device.

In the present mobile stations as those described above and other electronic devices with a keyboard, the major problem in implementation is the large number of connection lines especially when the keyboard includes a large number of keys, such as the numerical keys and the alphabetical keys. The Nokia 9110 Communicator device, for instance, has both a numerical keyboard and an alphabetical keyboard essentially like the one in computers, but smaller. The operation of a keyboard is relatively simple, but because of the large number of connection lines, the application specific integrated circuit, ASIC, becomes rather large, and the increase in the price of the circuit also increases the price of the complete device.

Each connection line requires the implementation of a connection element on the application specific integrated circuit. This connection element uses a lot more of the surface area of the semiconductor chip used for the implementation of the application specific integrated circuit than, for example, the implementation of other logic operations. Thus the number of connection lines increases the surface area of the semiconductor chip and, on the other hand, remarkably limits the number of functions that can be implemented on the ASIC. The number of connection lines of the ASICs used in mobile stations has not changed much between different generations. At the same time, the manufacturing technology of the application specific integrated circuits has developed from the line width of 0.55 µm to the line width of 0.18 µm, and the packing density of the logic has become 16 times higher. Because similar development will probably continue, the connection lines will form a more considerable limitation for the implementation of application specific integrated circuits.

Each keyboard connection line coupled to an application specific integrated circuit must be protected against an electrical static discharge (ESD). A keyboard is very sensitive to problems caused by an electrical static discharge. Because of this, there have been problems with electrostatic protection of the keyboard in the design of mobile stations including PDA properties. With the present application specific integrated circuits, which have a line width of 0.25-0.35 µm, it is not possible to implement sufficient electrostatic protection in the application specific integrated circuit internally, but the protection must be realized with components external to the application specific integrated circuit. This again results in the situation that the components that protect from an electrostatic discharge increase the surface area and price of the circuit board. The situation will become even more difficult in the future when the manufacturing technologies of application specific integrated circuits develop towards even more narrow line widths.

In mobile stations in which the keyboard is implemented in a sliding or turning element of the mobile station, the problem is the realization of the interface between the mobile station and the keyboard, because a prior art keyboard of a mobile communication device implemented with a circuit board requires more than ten separate signals. The more signals have to be taken over this interface, the more complicated, more expensive and more vulnerable to errors the implementation becomes. In addition, the keyboards implemented by means of a circuit board according to the above have the problem that they are relatively thick.

A known electronic device like the one described above, in which an attempt has been made to solve the above described problems, has been presented in the U.S. Pat. No. 5,584,054. An electronic device comprises a touch sensitive display disposed in the body housing element, whereby the operations of the electronic device can be controlled by touching the activation areas of the display. The touch sensitive display also comprises a display area in which information used in mobile stations, such as telephone numbers, can be shown. In connection with the touch sensitive screen, there is provided a rigid cover arranged as movable with a hinge, which can be turned in a closed position over the touch sensitive display. In apertures made in the cover, there are also arranged mechanical activation elements, or keys, so that when the activation elements are depressed when the cover is in the closed position, they touch the activation areas of the touch sensitive display and thus transmit the depression to the display for activating the functions of the device. The electronic device presented in the U.S. Pat. No. 5,584,054 operates as a mobile station when the cover is in the closed position. The electronic device also operates as a PDA device when the cover is in the opened position, whereby the operations of the electronic device can be controlled by touching the activation areas of the display directly with a finger or a pointed object resembling a pen. When the cover is in the opened position, depressing the keys has no effect, because in this position of the cover the movement of the keys does not extend to the touch sensitive screen. The hinge of the cover of the electronic device is provided with a switch, which recognizes the position of the cover and controls the operation of the electronic device. The cover also functions as a protective cover for the touch sensitive display. The prior art technology also provides mobile stations with a rigid, level, non-transparent cover, which protects the keyboard disposed in the body of the mobile station and which can be opened and closed. The cover is often provided with an opening, through which the display or display area of the mobile station can be read. Often the cover also includes the microphone of the mobile station, whereby the cover must be opened for the duration of the phone call.

In an electronic device according to the invention described above it is not possible to use the keyboard and the whole display at the same time. When the cover is closed for using the keyboard, only a small portion of the possible display area is available for use. When a part of the display area is reserved as activation areas, it is not possible to present as much information on the display as in electronic devices with a separate keyboard and a display. When the cover of the electronic device is open and the electronic device is used by means of the touch-screen display, the whole display area is still not in use, because part of the display area is reserved as activation areas. In addition, it is difficult for the user to get any other feedback from pressing the activation area than possible changes on the display.

It is an object of this invention to provide an electronic device in which the whole display area and keyboard are available for use at the same time. According to the invention, this object can be achieved by implementing the keyboard instead of the display as a separate element which can be exposed by sliding or turning. Another object of the invention is to achieve an electronic device, in which the keyboard interface is much simpler than in the conventional solution. According to the invention, this object can be achieved by implementing the keyboard by means of a touch sensitive element. A third object of the invention is to provide a keyboard of an electronic device, which gives the user immediate feedback for the success of the depression of a key. According to the invention, this object can be achieved by placing a conventional keyboard mat or membrane over the touch sensitive element. A fourth object of the invention is to achieve a keyboard element of an electronic device, which would be considerably thinner compared to the prior art solutions. According to the invention, this object can be achieved by implementing the keyboard by means of a touch sensitive element.

To put it more accurately, the electronic device according to the invention is characterized in what is set forth in the characterizing part of claim 1. In addition, the method according to the invention is characterized in what is set forth in the characterizing part of claim 9. In addition, the keyboard according to the invention is characterized in what is set forth in the characterizing part of claim 15.

The present invention provides considerable advantages as compared to the prior art solutions. When the electronic device has a keyboard disposed in a separate element, which is exposed by sliding or turning, it is not necessary to reserve certain areas of the display as activation areas for the keyboard, but the entire display area is available for displaying the information to be presented. When the keyboard is implemented with a touch sensitive element, the interface between the keyboard and the body of the electronic device becomes much simpler, and the number of I/O (input/output) signals can be reduced to two at the best, whereby the construction becomes much simpler, cheaper and less vulnerable to damage. When a prior art keyboard mat has been installed on the touch sensitive element, the user receives a good feedback when depressing a key, which is a very important property of a user interface. Especially people with large fingers will find it much easier to use the small keys of mobile stations correctly, if the user has a good tactile feel of the keyboard. A good tactile feel can be provided for the user by using a keyboard mat similar to the conventional type on top of the touch sensitive element.

In the following, the invention will be described in more detail with reference to the accompanying drawings, in which FIG. 1 shows an electronic device according to a preferred embodiment of the invention, in which the keyboard is implemented in an element which slides out.

Figure 1:
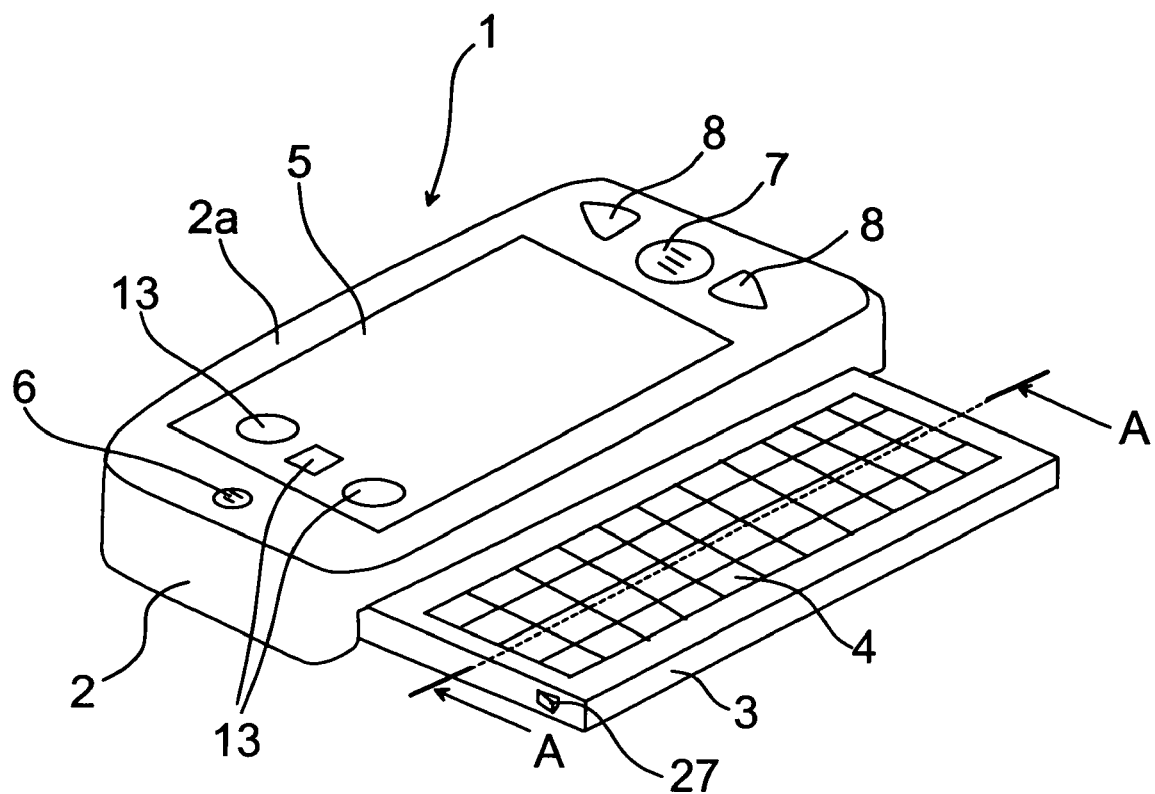

A keyboard of an electronic device according to the invention can be used, for example, in PDA devices, portable computers and mobile stations. In this specification, a mobile station is used as an example of an electronic device. FIG. 1 shows a mobile station 1 according to the invention, which comprises a keyboard element 3 and a body housing element 2, the front panel 2a of which includes a display 5, a microphone 6, an earphone 7 and possibly one or more function keys 8. It is clear that, for instance, some of the function keys 8 can also be placed in an other part of the housing than the front panel 2a. The keyboard element 3 includes the keyboard 4 of the mobile station. In addition, the body housing element includes a sensor element 27, such as a switch, which recognizes if the keyboard element 3 is out or pushed into the body housing element 2.

Figure 2:
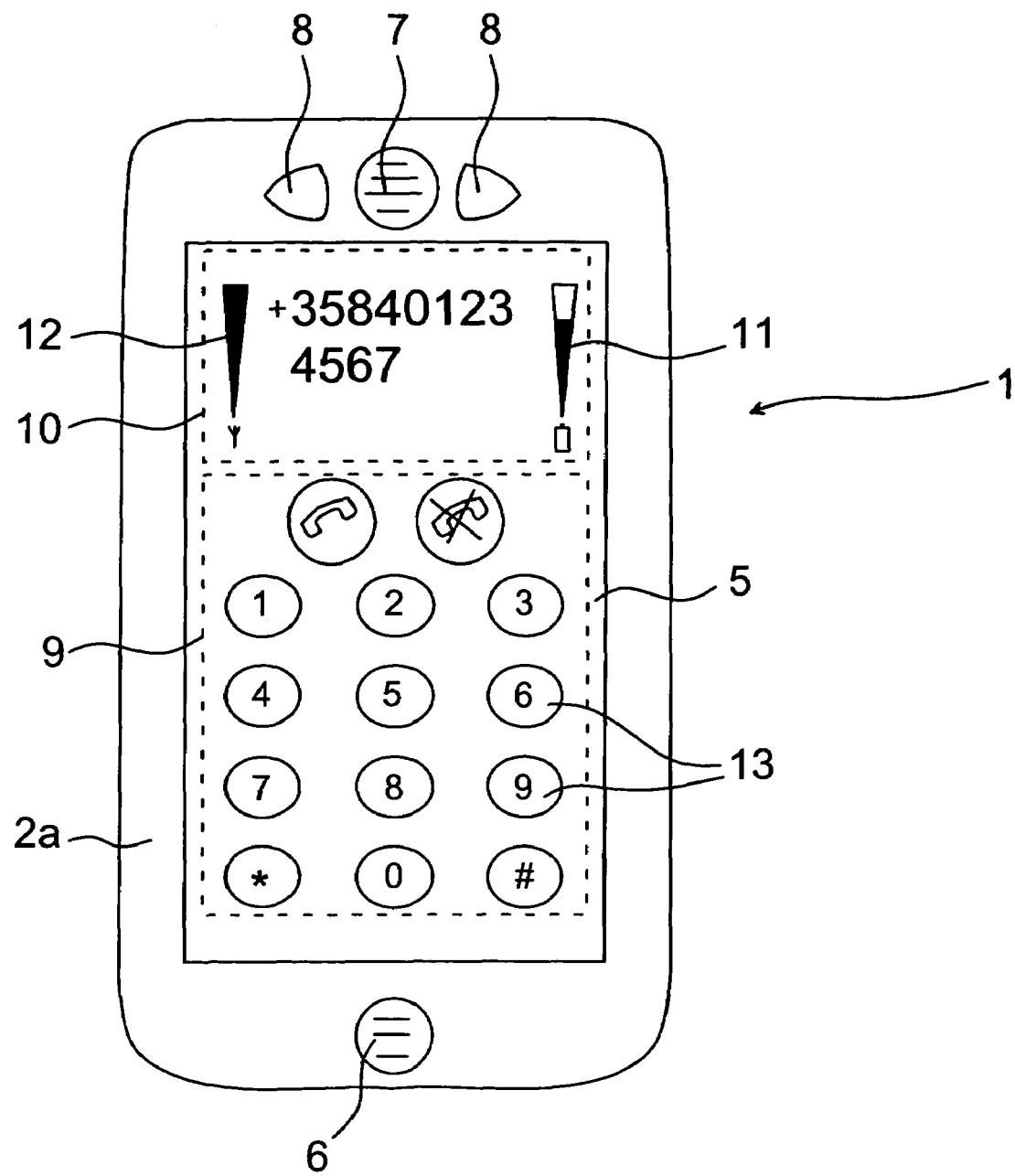
FIG. 2 shows an electronic device according to FIG. 1 seen from above and the keyboard element as pushed into the body of the device.

The display 5 is preferably a depression responsive touch sensitive liquid crystal display (LCD), which also recognizes a touch with a weak intensity. The liquid crystal display is provided with, for instance, a touch sensitive membrane or other corresponding and well known technology, which also recognizes the touching point. When the keyboard element is not exposed, or it is pushed into the body 2 as shown in FIG. 2, this touch sensitive display 5 preferably comprises a group 9 of activation areas for activating the telephone functions of the device 1 by touching the activation areas 13 and preferably at least one display area 10 for presenting variable information, such as a telephone number, the state of the battery 11 of the device and the strength of the signal 12 received by the device 1. The user activates the operations normally by depressing the keys lightly with a finger, but the depression can also be carried out with a pointed object or the like, when the touch-recognition technology used allows it. The points to be depressed, or the activation areas 13 for activating different telephone functions of the device 1 can also be shown by rectangles, circles or corresponding figures drawn on the display 5 by the control program of the device 1, combined with symbols or other markings in connection with the figures, when required. The size, shape and location of these activation areas 13 and the display area 10 can vary. In addition, there can be many separate display areas 10 on the display.

The telephone functions mentioned above are preferably functions which can be performed in conventional telephones with a memory for telephone numbers and the corresponding names. Functions like this are calling, answering an incoming call and retrieving a telephone number from the memory. The number memory can be browsed, for example, by function keys 8 or by activation areas 13 created for browsing.

Other functions that are well known from conventional mobile stations and PDA devices, such as handling text messages, saving telephone numbers, keeping a calendar and selecting a ringing tone, are preferably performed when the keyboard element 3 is drawn out from the bottom of the body housing element 2. Then the user has a display area 10 with the full size of the display 5 available for the presentation of information and a good keyboard 4 for the input of information. It is also possible that part of the display 5 is reserved for the use of the activation areas 9, whereby only part of the area of the display 5 remains for the use of the display area 10. However, when the keyboard element is drawn out, the need for activation areas is smaller, and thus more room remains for the display area than when the keyboard element 3 is pushed into the body housing element 2.

Figure 3:
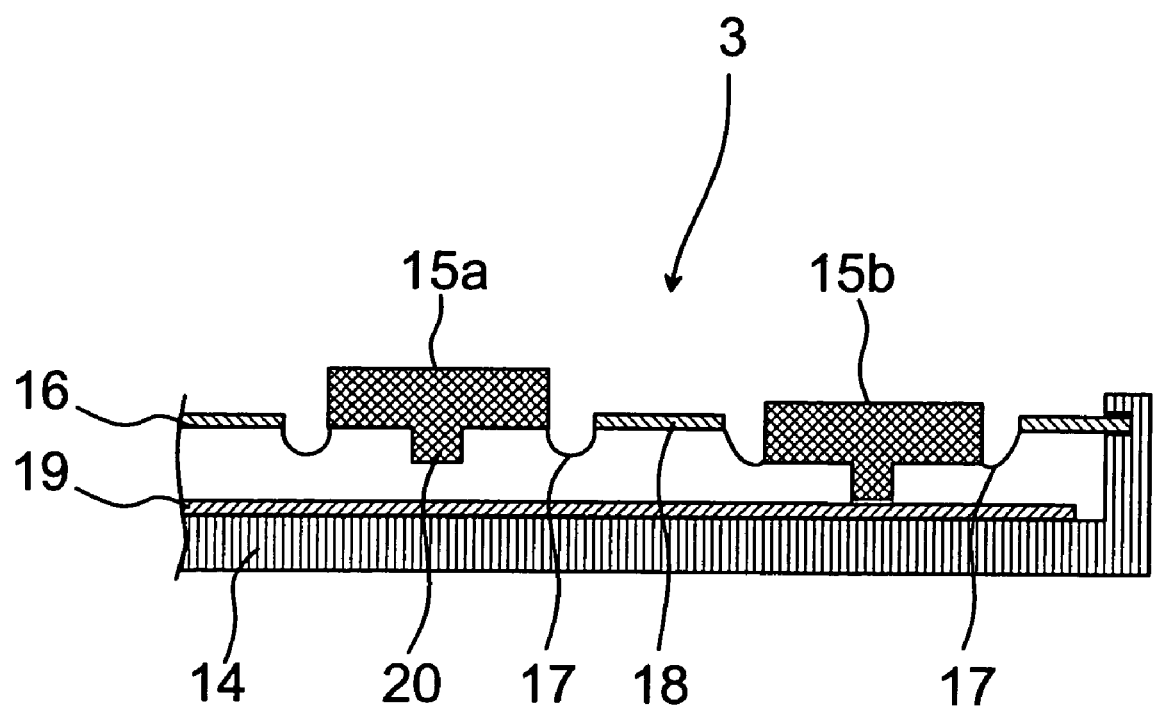
FIG. 3 shows an electronic device according to FIG. 1 as seen from the section A-A.

FIG. 3 shows a cross-section of a keyboard element 3 of a mobile station according to a preferred embodiment of the invention. This keyboard element 3 preferably comprises a housing element 14, a touch sensitive element 19 known per se and a keyboard mat 16 known per se, which in turn consists of keys 15a, 15b, spring means 17 and a support means 18. The spring means is preferably made of some elastic material, and it is fastened to both the support means and the key, thus tying the key and the support means elastically together. The purpose of the spring means is to enable the mobility of the keys so that the key can be pressed down 15b, and when the key is released, it returns up 15a. The support means 18 is preferably a plate made of rigid material with holes for each key 15a, 15b supported by a spring means 17. The support means 18 is fastened at the edges securely to the housing 14 of the keyboard element so that when the keys are up 15a, the touching element 20 of each key is essentially at the same, specified distance from the touch sensitive element. This distance can be, for example, 0.3-1.0 mm.

The implementation of the keyboard 4 is such that a keyboard plate 16 is placed over the touch sensitive element 19. This keyboard plate is installed over the touch sensitive element as fixed. The keyboard plate is preferably a keyboard mat, whereby the user gets a good tactile feel of the keyboard and as good feedback as possible when a key is depressed. Then an experienced writer can write merely on the basis of the feel and looking at the writing on the display. In the scope of this invention, the keyboard plate 16 can also be a membrane (not shown), preferably a bubble membrane, on which key markings have been made for showing the places of the keys 15a, 15b. An alternative way for manufacturing the keyboard plate 16 is to form the keyboard plate 16 of separate keys and a supporting plate (not shown). One more alternative is to manufacture the keyboard plate 16 with two-phase injection moulding. Then the frame is made of rigid material, such as rigid plastic, and in the second phase its holes are filled by injection moulding with some softer and more elastic material, such as a soft plastic mixture, thus forming the keys (15a, 15b) so that the frame and the keys form a solid entity.

Figure 4:
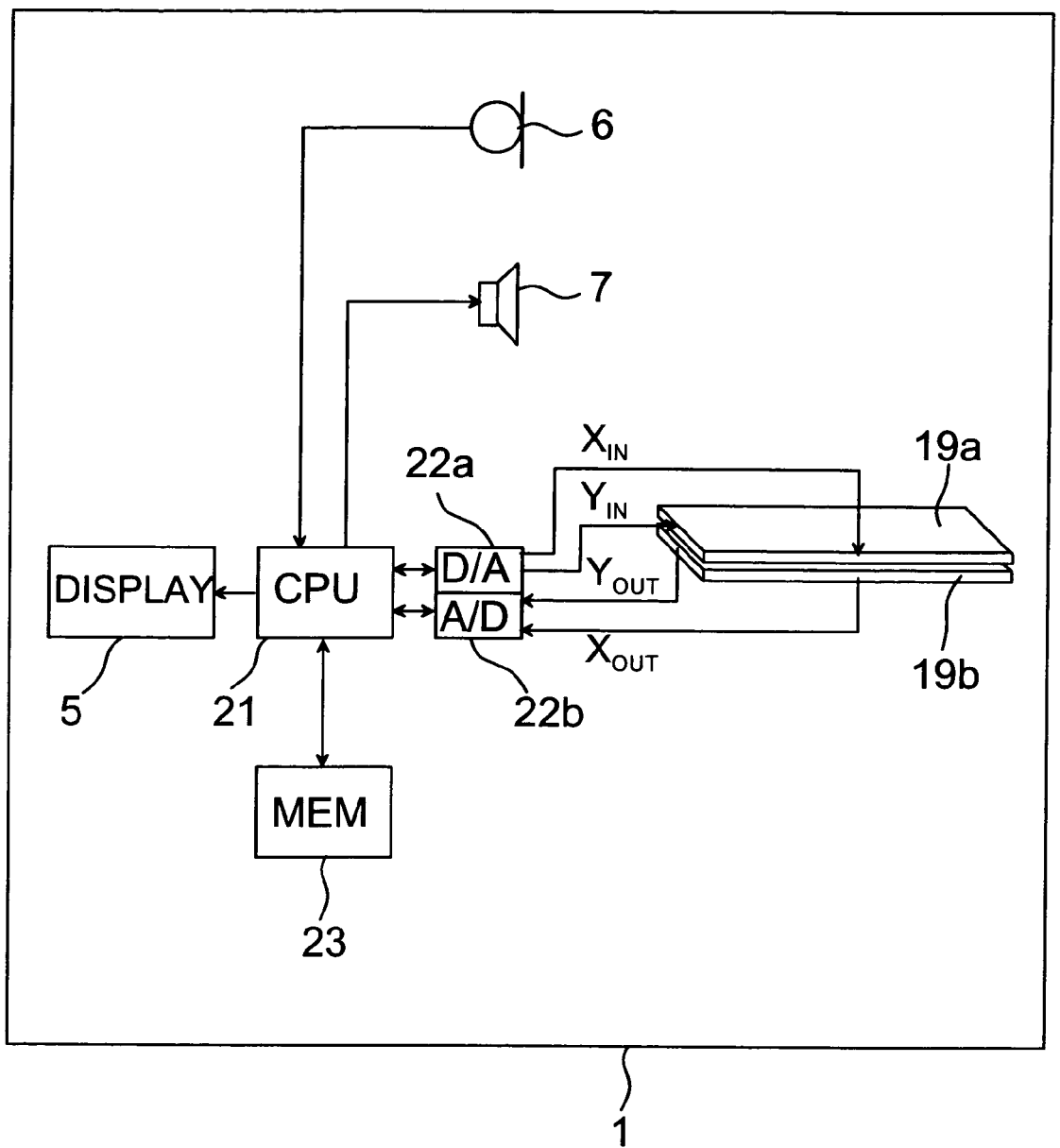
FIG. 4 shows a schematic diagram of the electronic device and a preferred implementation of the touch sensitive element.

The touch sensitive element 19 can be implemented so, for instance, that it is preferably formed of two essentially rectangular membranes of the same size 19a, 19b (FIG. 4), which are arranged at a specified distance from each other and preferably essentially parallel. The membrane on top, or the one on which the touch is targeted, is made of some resistive material. On the upper membrane there are two conductors Xin, Yin connected on adjacent sides, and the other sides are connected to the 0 potential. On the lower membrane there are also conductors Xout and Yout connected on adjacent sides. Xin and Xout are connected on the same sides of the membranes 19a, 19b and essentially at the same points. Correspondingly, Yin and Yout are connected on the same sides of the membranes 19a, 19b and essentially at the same points.

When a key is pressed down 15b, the touching element 20 presses the touch sensitive element 19 below it with such a great strength that the upper membrane 19a touches the surface of the lower membrane 19b, and thus a contact is created between the membranes. An A/D converter 22b detects the depression by examining at times, which is called polling, whether a key has been depressed. For the duration of the polling, a constant voltage is preferably switched from the D/A converter 22a to the Xin line, for example, and the voltage of the Xout line is measured. If the voltage differs essentially from zero, a key has been depressed, whereupon the X coordinate is calculated from the voltage value. The voltage in the Xout line is the higher the closer the contact point is to the edge to which the conductors Xin and Xout are connected. After this, the Y coordinate is received in a corresponding manner preferably by switching a constant voltage to the Yin line from the D/A converter 22a and by measuring the voltage of the Yout line. The voltage in the Yout line is also the higher the closer the contact point is to the edge to which the conductors Yin and Yout are connected. For the duration of specifying the X coordinate, Yin is switched to a high-impedance mode to prevent it from distorting the measurement result. Correspondingly, Xin is switched to a high-impedance mode when the Y coordinate is being specified.

Another alternative method for manufacturing a touch sensitive element 19 is to use an EMFi membrane (not shown). The EMFi membrane consists of a porous polypropylene membrane, which is coated with an electricity conducting metal layer. The pores of the polypropylene membrane have an electric charge, whereby the force effect targeted at the EMFi membrane presses the porous polypropylene membrane, which causes a change in the intensity of the electric field of the EMFi membrane. This again causes a transfer of charges between metal surfaces. This transfer of charges can be detected by switching the metal surfaces to an external electrical circuit, in which the current strength in this circuit is measured.

Because in a mobile station 1 according to a preferred embodiment of the invention, the keyboard 4 is implemented by using a touch sensitive element 19, there is much more room left on the circuit board (not shown) for other components. Alternatively, the circuit board can be made thinner or its size reduced considerably, whereby the manufacturing costs of the mobile station 1 are also substantially reduced. This is due to the fact that in the prior art implementations the keyboard is normally constructed on a circuit board. In a mobile station 1 according to the invention, only four lines need to be drawn on the circuit board for the keyboard.

With a mobile station 1 according to a preferred embodiment of the invention, it is very easy to change the keyboard 4 to one with a different appearance, location, number or meaning of the keys 15a, 15b. This can be done by changing the desired keyboard mat 16 to the mobile station and by programming the coordinates and meaning of the keys in place of the old ones. It is also possible to save many different keyboard appearances to the memory 23 of the mobile station 1, whereby the keyboard can be changed by changing the keyboard mat 16 to the mobile station 1 and by selecting the setting corresponding to the keyboard mat 16 from the menu of the mobile station 1. This provides, among other things, the advantage that companies that manufacture mobile stations need not manufacture different mobile stations for each different language area, but the same model of a mobile station can be used in all the places where the same telecommunications standard is used. The manufacturers need to take the appearance of the keyboard 4 into account at the end of the manufacturing process by installing the correct keyboard mat 16 in the mobile station and by selecting from the menu of the mobile station 1 the setting which corresponds to the keyboard mat 16 or by programming the coordinates and meaning of the keys in place of the old ones.

Figure 5:
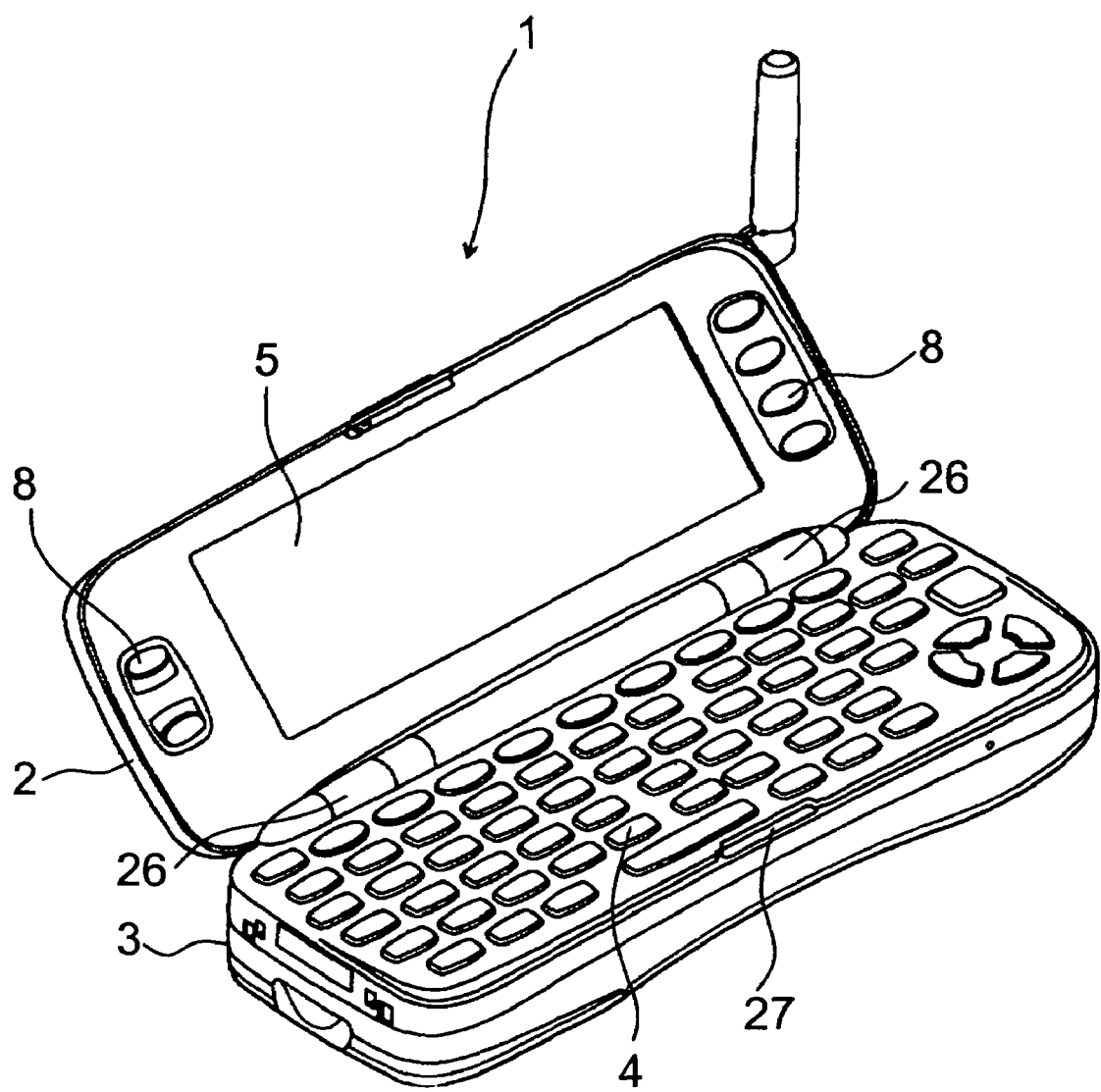
FIG. 5 shows an electronic device according to a preferred embodiment of the invention, in which the exposable keyboard is implemented in a turning element.
Figure 6:
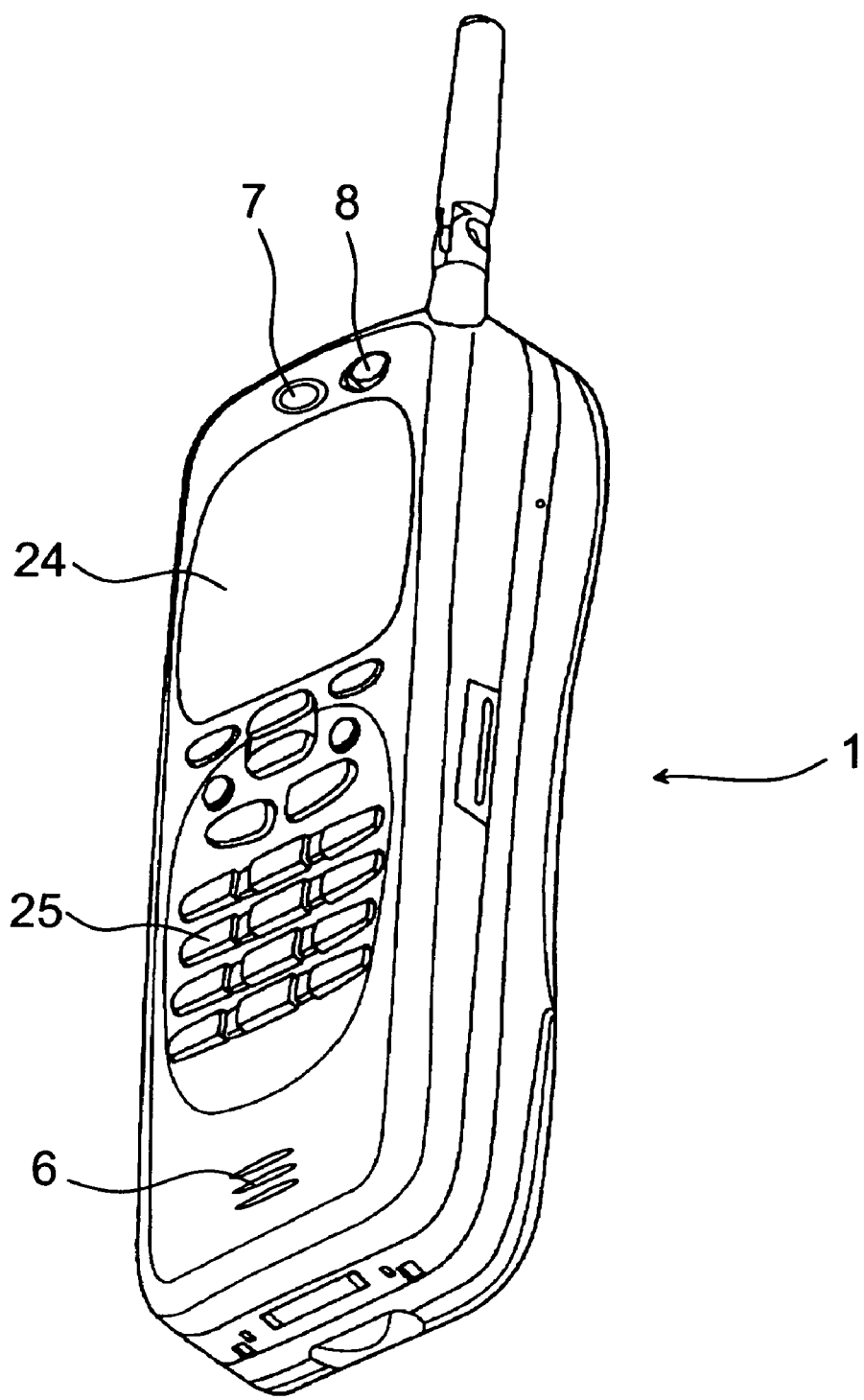
FIG. 6 shows the electronic device according to FIG. 5 seen from above and the keyboard element in the closed position.

The mobile station can also be implemented so that the keyboard element 3 is arranged in relation to the body housing element 2 as turning by means of at least one hinge 26 as shown in FIG. 5. In this case the display 5 and the keyboard 4 are located preferably so that when the keyboard element 3 is in the closed position, or the keyboard element functions as protection for the display 3, the keyboard 4 is within the mobile station 1. In order to make it possible to use the telephone functions without turning the keyboard element out, another display 24 and another keyboard 25 are preferably arranged in the mobile station as shown in FIG. 6. This other keyboard 25 preferably comprises only the keys needed for using all the telephone functions. The other display 24 is preferably such that all the necessary information for using the telephone functions can be shown on it.

It is clear that in practical applications, the mobile station 1 according to the invention can differ from the embodiments described above. For example, the mobile station 1 can be implemented so that the keyboard is disposed in the body housing element 2 and the display 5 in an exposable, sliding or turning display element. It is also possible to install both the keyboard 4 and the display in the body housing element 2, but then the size of the mobile station would become larger than in the embodiments described above.

The present invention is not limited to the above described embodiments only, but its details can be modified without departing from the scope defined by the attached claims.

The invention claimed is:

1. An electronic device, having a keyboard, said keyboard comprising:
   a touch sensitive element,
   a keyboard plate fixed over the touch sensitive element so that the depression of a key of the keyboard plate causes said key to touch the touch sensitive element essentially at a position on the touch sensitive element corresponding to the point of the key and
means for correlating the position of touching on the touch sensitive element, according to which key is depressed, wherein the keyboard is slidably mounted in the electronic device and further wherein the electronic device comprises at least one body housing element, wherein the keyboard is slidable between a first and a second extreme position, and further wherein, in the first extreme position the keyboard is under the body housing element so that the keyboard is at least partly invisible, and in the second extreme position the keyboard is preferably so that the keyboard is essentially entirely exposed.

2. An electronic device according to claim 1, wherein the keyboard plate is a keyboard mat.

3. An electronic device according to claim 1, wherein the keyboard plate is a bubble membrane.

4. An electronic device according to claim 1, wherein the keyboard is slidably mounted in the electronic device.

5. An electronic device according to claim 1, which comprises at least one body housing element, further comprising a keyboard arranged for turning in relation to the body housing element.

6. An electronic device according to claim 5, wherein the keyboard is turnable between a first and a second extreme position, and further wherein, in the first extreme position the keyboard is preferably placed over the body housing element so that the keyboard functions as protection for the display and the keyboard is at least partly invisible, and in the second extreme position the keyboard is preferably so that the keyboard and the display are essentially entirely exposed.

7. An electronic device according to claim 6, further comprising another display and a second keyboard arranged for activating one or more functions of the electronic device preferably when the keyboard is in said first extreme position.

8. An electronic device according to claim 1, further comprising a position recognizing element for recognizing the position of the keyboard element.

9. A method for recognizing the depression of a key of the keyboard of an electronic device, which keyboard is used for controlling the functions of the electronic device, in which method the keys are formed into a keyboard plate, wherein the keyboard comprises a touch sensitive element, over which the keyboard plate is fixed so that the depression of a key causes said key to touch the touch sensitive element essentially at the point of the key, and that the point of touching of the touch sensitive element is correlated according to which key is depressed and further wherein, the keyboard is slidably mounted on the electronic device and at least one body housing element is formed in the electronic device, wherein the keyboard is slidable between a first and a second extreme position, and wherein, in the first extreme position the keyboard is under the body housing element so that the keyboard is at least partly invisible, and in the second extreme position the keyboard is preferably so that the keyboard is essentially entirely exposed.

10. A method according to claim 9, in which the electronic device is provided with at least one body housing element, and wherein the keyboard is capable of turning in relation to the body housing element.

11. A method according to claim 9, wherein the keyboard turns between a first and a second extreme position, and wherein, in the first extreme position the keyboard is preferably placed over the body housing so that the keyboard functions as protection for the display and the keyboard is at least partly hidden, and in the second extreme position the keyboard and the display are essentially entirely exposed.

12. A method according to claim 11, wherein the electronic device is provided with a second display and another keyboard for activating one or more functions of the electronic device when the keyboard is in said first extreme position.

13. A method according to claim 9, wherein the keyboard plate is a keyboard mat.

14. A method according to claim 9, wherein the keyboard plate is a bubble membrane.

15. A method according to claim 9, wherein the electronic device is provided with a position recognizing element for recognizing the position of the keyboard element.

* * * * *